(12) United States Patent
Smook et al.

(10) Patent No.: US 7,806,799 B2
(45) Date of Patent: Oct. 5, 2010

(54) GEAR TRANSMISSION UNIT WITH PLANETARY GEARS

(75) Inventors: Warren Smook, Gauteng (ZA); Roger Bogaert, Dendermonde (BE)

(73) Assignee: Hansen Transmissions International N.V., Edegem (BE)

( * ) Notice: Subject to any disclaimer, the term of this patent is extended or adjusted under 35 U.S.C. 154(b) by 902 days.

(21) Appl. No.: 10/570,992

(22) PCT Filed: Nov. 19, 2004

(86) PCT No.: PCT/IB2004/003935
§ 371 (c)(1), (2), (4) Date: Mar. 6, 2006

(87) PCT Pub. No.: WO2005/050058
PCT Pub. Date: Jun. 2, 2005

(65) Prior Publication Data
US 2008/0274849 A1  Nov. 6, 2008

(30) Foreign Application Priority Data
Nov. 20, 2003  (GB)  ................................ 0326951.1

(51) Int. Cl.
*F16H 57/08* (2006.01)
(52) U.S. Cl. .................. 475/344; 475/346; 475/348
(58) Field of Classification Search .......... 475/344, 475/346, 347, 348
See application file for complete search history.

(56) References Cited

U.S. PATENT DOCUMENTS

| | | | | |
|---|---|---|---|---|
| 2,749,778 A | * | 6/1956 | Kuhn | 475/347 |
| 3,137,180 A | * | 6/1964 | Dragonuk | 475/16 |
| 3,160,026 A | * | 12/1964 | Rosen | 74/410 |
| 3,307,433 A | * | 3/1967 | Bennett et. al. | 475/342 |
| 4,271,928 A | * | 6/1981 | Northern | 184/6.4 |
| 4,391,163 A | | 7/1983 | Benthake et al. | |

(Continued)

FOREIGN PATENT DOCUMENTS

| | | |
|---|---|---|
| DE | 22 35 448 | 2/1974 |
| EP | 1 045 140 | 10/2000 |
| WO | WO 01/31231 | 5/2001 |
| WO | WO 02/14690 | 2/2002 |
| WO | WO 02/079644 | 10/2002 |

OTHER PUBLICATIONS

Machine Design Theory and Practice—Deutschman et al—Macmillan Publishing Co., Inc.—pp. 463-468.*

(Continued)

*Primary Examiner*—Ha D. Ho
(74) *Attorney, Agent, or Firm*—Young & Thompson

(57) ABSTRACT

A planetary type gear transmission unit (11) suitable for a wind turbine (10) includes sun (27), planet (25) and ring (24) gears and a planet carrier (41), the planet carrier (28) including a planet bogie plate (43) which supports and locates circumferentially spaced pairs of planet gears (25) a planetary type gear transmission unit (11) includes sun (27), planet (25) and ring gears (24) and a planet carrier(28), the planet carrier (28) including a planet bogie plate (43) which supports and locates circumferentially spaced pairs of planet gears (25), the sun (27) and ring gears (24) being each of the double helical type and each of the planet gears (47) of a pair being of the single helical type and of a helix angle opposite to that of the other planet gear (48) of the pair.

13 Claims, 6 Drawing Sheets

U.S. PATENT DOCUMENTS

| | | | | |
|---|---|---|---|---|
| 5,472,383 | A | * | 12/1995 | McKibbin .................. 475/159 |
| 6,232,673 | B1 | | 5/2001 | Schoo et al. |
| 6,459,165 | B1 | | 10/2002 | Schoo |
| 7,291,088 | B2 | * | 11/2007 | Arndt et al. ................ 475/331 |

OTHER PUBLICATIONS

Thornblad P: "Gears for Wind Power Plants" International Symposium on Wind Energy Systems, XX, XX, 1978, pp. C689-C6106, XP002133564.

* cited by examiner

GEAR TRANSMISSION UNIT WITH PLANETARY GEARS

This invention relates to a gear transmission unit and in particular, though not exclusively, to a planetary type gear transmission unit. It may be applied to a gear transmission unit for a wind turbine.

There is a continuing demand for larger wind turbines especially for offshore sites due to scarcity of suitable sites and cost of civil works. At the same time the requirements for reduction of size and weight of the machines and their components become more and more important. Typically a wind turbine rotor drives the low speed shaft of a gear transmission unit, which transforms torque and speed of the rotor to the required torque and speed of an electrical generator.

Integration of the components in a wind turbine is a way to reduce the weight and to make the drive assembly more compact, but it is important that the design and execution of the drive assembly avoids mutual interference of the external and internal loads on the different components. It is also important that the construction can be achieved economically and is reliable, notwithstanding the high power density requirements for many wind turbine applications.

The present invention is directed particularly but not exclusively to the problem of providing an improved gear transmission unit of the epicyclic type and which, for example, may be utilized on a wind turbine assembly.

In accordance with one aspect of the present invention a planetary type gear transmission unit comprises sun, planet and ring gears and a planet carrier, said planet carrier comprising a planet bogie plate which supports and locates circumferentially spaced pairs of planet gears, said sun and ring gears being each of the double helical type and each of the planet gears of a pair being of the single helical type and of a helix angle opposite to that of the other planet gear of the pair.

Preferably at least one, and more preferably both, of the sun and ring gears is of unitary, i.e. non-split, double helical type.

The gear unit may comprise planet gears which are arranged in axially aligned pairs. That is, the planet gears of a pair may be co-axially arranged.

Preferably the bearings may support respective pairs of aligned planet gears, typically the two planet gears of each pair being positioned at opposite sides of the bogie plate.

In consequence of the use of a bogie plate and single helix planet gears arranged in pairs the present invention most advantageously allows use to be made of helical gears without the need to utilise split ring and sun gears, and encounter the potential power limitations associated with split gears. Furthermore there results a quieter noise pattern than that associated with conventional spur gears.

Bearings for each circumferentially spaced planet gear position may be supported on a shaft which in use is able to self adjust in said angular position relative to the bogie plate.

Alternatively said shaft may be substantially rigidly secured to the bogie plate. The bogie plate may be of a kind which, in consequence of elastic deformation, is compliant to an extent sufficient to allow self adjustment of the angular position of the shaft relative to the axis of rotation of the ring gear, for example in the case of a shaft which is substantially rigidly secured to the bogie plate.

Each planet gear may be rotatably mounted on the shaft by one or a pair of roller bearings, for example, by a pair of spherical bearings, or by a pair of tapered roller bearings or by one or a pair of cylindrical bearings. If tapered roller bearings are employed, preferably they are arranged in an 'O' configuration.

As considered in an axial direction parallel with the axis of rotation of the planet carrier, a main bearing for rotatably supporting a ring gear relative to a planet carrier may lie at a position substantially aligned axially with the axial position of at least the ring gear of the gear transmission unit.

In some embodiments of the invention it may be preferred that the sun, planet and ring gears lie in a transverse plane (perpendicular to the rotation axis of said rotational forces) which also contains said main bearing.

The ring gear may provide axial and radial locations for the main bearing. The ring gear may have a radially outer surface of a stepped profile to define a shoulder for axial location of an inner bearing ring of the main bearing. The inner bearing ring may be secured axially and non-rotatably between said shoulder a supporting structure.

The ring gear may be provided with a reinforcing ring, and said reinforcing ring may extend axially and or radially beyond the toothed surface of the ring gear. Said reinforcing ring may provide an axial location of the main bearing.

The main bearing may comprise a double taper bearing, and said double taper bearing may comprise a single outer bearing ring. The double taper bearing may comprise rollers arranged in an O configuration, that is, a configuration in which the rollers of one series increase in diameter in a direction away from the rollers of the other series of the pair.

In a yet further of its aspects the present invention provides a wind turbine comprising rotors, a generator and a drive assembly comprising a gear transmission unit of a type in accordance with the present invention. In said drive assembly the ring gear typically may be supported non-rotatably relative to supporting structure.

A part of the gear transmission unit, e.g. a housing thereof, may be arranged to support an electrical generator.

BRIEF DESCRIPTION OF THE DRAWINGS

The invention will now be described, by way of example only, with reference to the accompanying diagrammatic drawings in which.

DETAILED DESCRIPTION OF THE INVENTION

Figure 1:
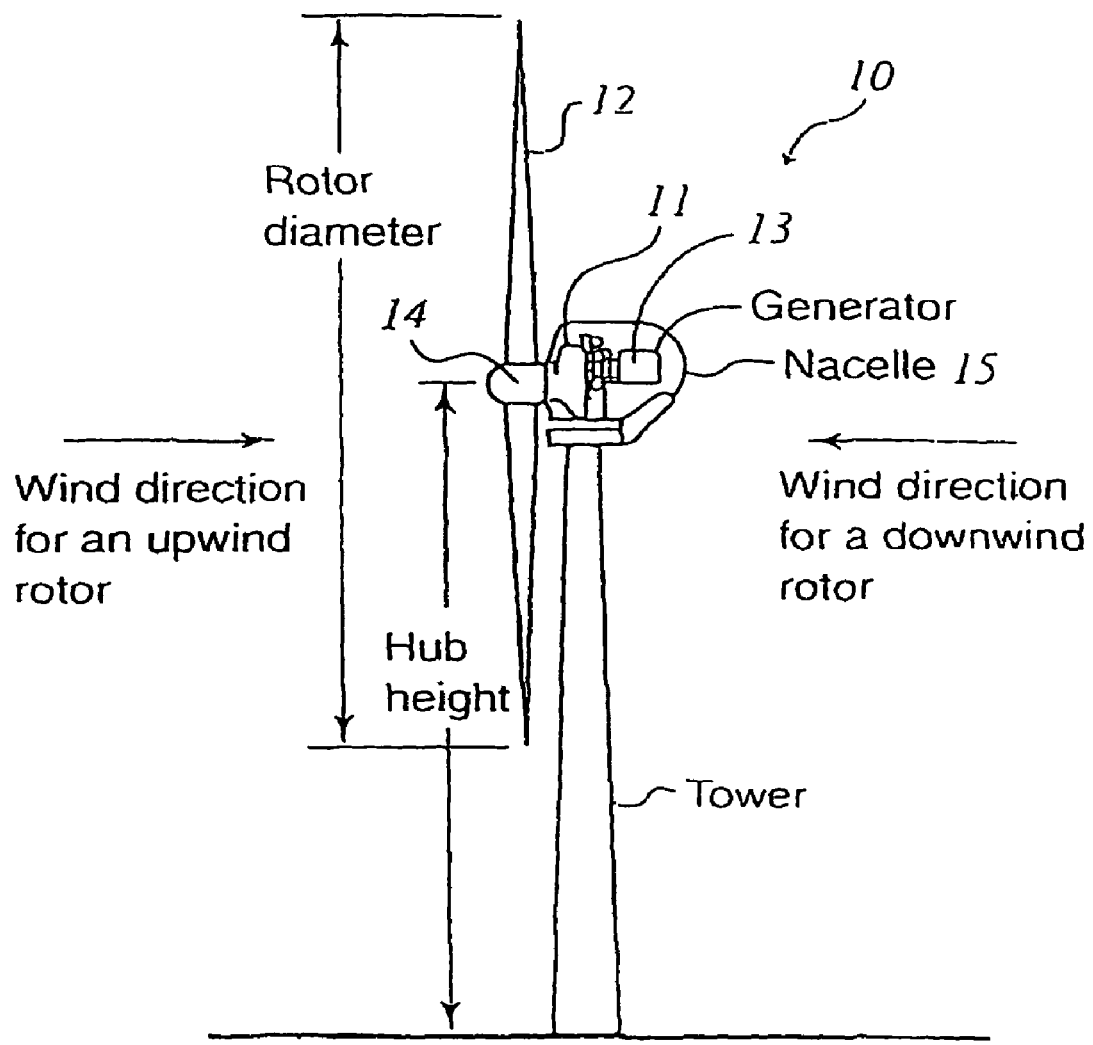
FIG. 1 is an elevation view of a wind turbine.

A wind turbine 10 (see FIG. 1) comprises a gear transmission unit 11 which acts to transmit torque from rotor blades 12 and a rotor hub 14 to an electrical generator 13, the gear transmission unit comprising an epicyclic gear unit. The gear transmission unit and generator are housed in and supported by a nacelle 15.

Figure 2:
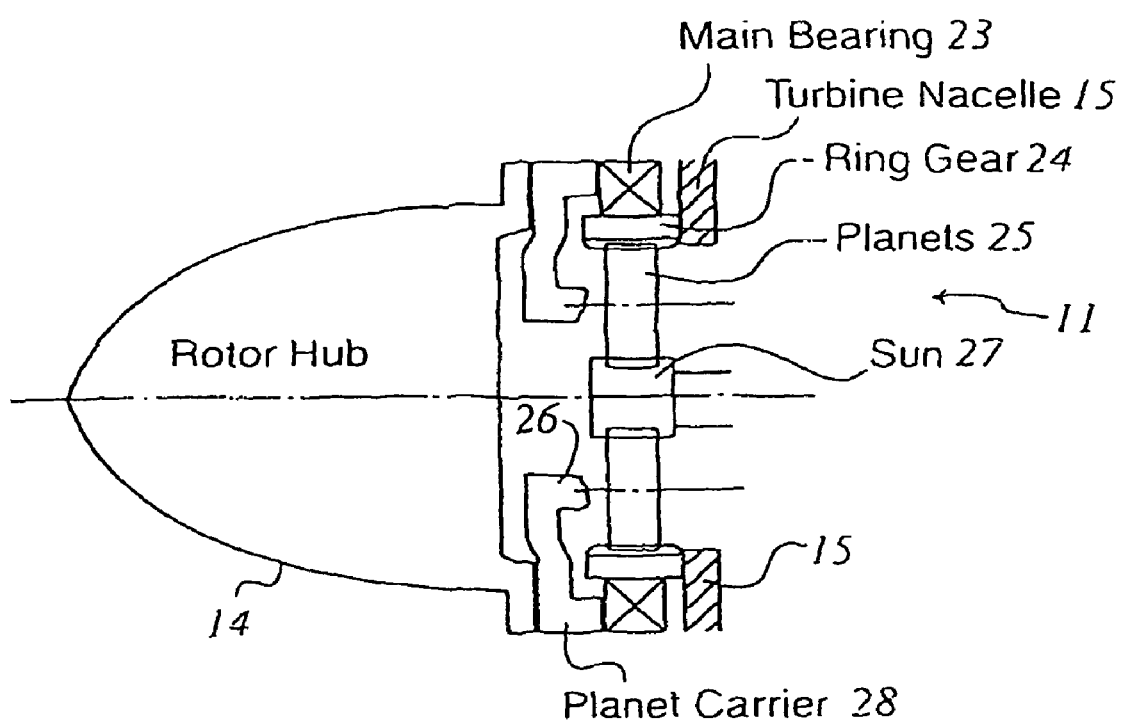
FIG. 2 is a sectional view of part of a gear transmission unit.

The gear transmission unit 11 is now described in more detail with reference to FIGS. 2 and 3. The gear transmission unit 11 comprises an epicyclic gear unit having four circumferentially spaced planet gears 25, a sun gear 27 a planet carrier 28, and a ring gear 24 which is non-rotatably mounted relative to the nacelle structure 15. Each of the gears is of a straight-cut, spur type.

The sun gear is connected to an output shaft (not shown) which connects either to a further gear unit or direct to the rotor of the generator 13.

The radially outer surface 29 of the ring gear 24 provides location and support for the inner ring 30 of a main bearing 23.

The outer ring 31 of the main bearing has secured thereto the rotor hub 14 and, interposed between the rotor hub and ring 31, the outer region 22 of the planet carrier 28.

Figure 3:
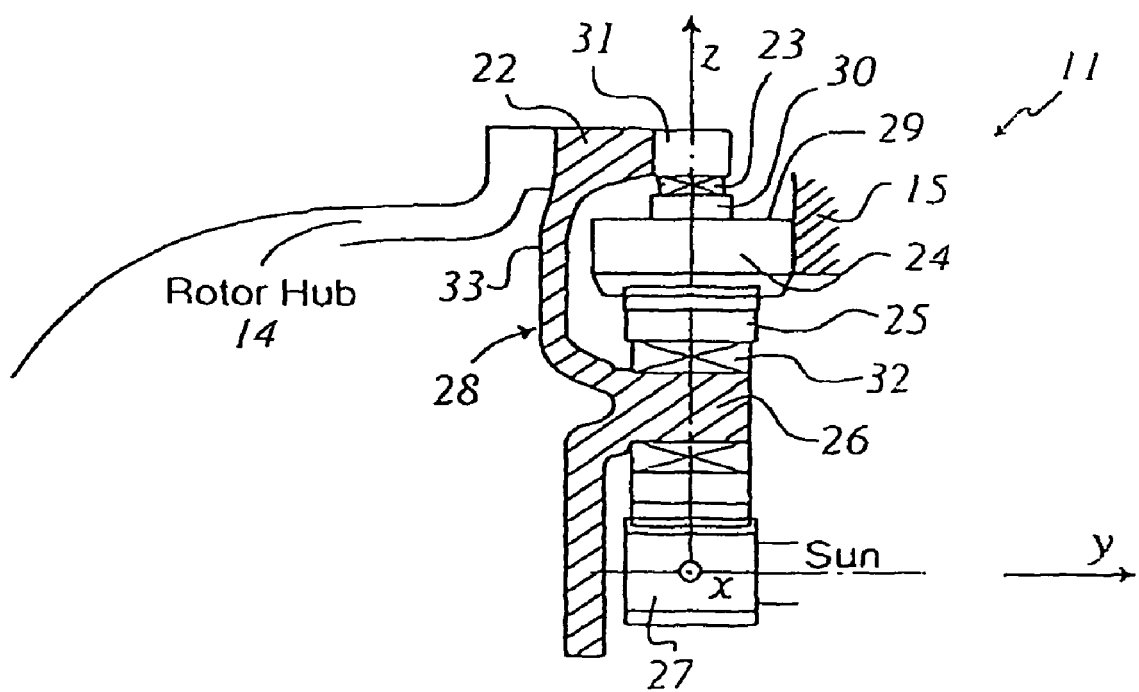
FIG. 3 shows part of FIG. 2 in more detail.

In a prior proposed construction the planet carrier 28 of FIG. 3 comprises four bearing support studs 26 uniformly circumferentially spaced to locate bearings 32 which rotatably support the four planet gears 25. The planet carrier 28 has an annular region 33 which extends radially between the radial position of the bearing studs 26 and the outer region 22 and is designed to be relatively stiff, in a circumferential direction about the Y axis, for transmission of torque between the region 22 and the bearing studs 26, but to be relatively flexible about the X and Z axis.

In accordance with the present invention the planet carrier 28 is replaced by a planet carrier 41 (see FIG. 4) provided, in this embodiment, with three integral and uniformly circumferentially spaced studs 42 which support a planet bogie plate 43. The planet bogie plate 43 provides support for three circumferentially uniformly spaced shafts 44 arranged each (as viewed in the plane of FIG. 4) to self adjust in angular position on the plate 43. Each shaft 44 provides support, at opposite sides of the plate 43, for a pair of taper roller bearings 45 and a pair of taper roller bearings 46 about which each of a pair of single helix planet gears 47, 48 are rotatably mounted for engagement with the ring gear 49 and sun gear 50. Each of the ring and sun gears is of the double helix type. Each planet gear of a pair has a helix angle equal to but opposite that of the other planet gear of the pair.

In the aforedescribed construction the torque acting on the rotor hub 14 under action of the rotor blades 12 is transmitted to the planet gears 47, 48 via the planet carrier 41 rotatably mounted at is outer region to the outer ring 31 of bearing 23. Bending moments and axial forces in the Y direction exerted by the rotor hub in this construction are transmitted direct to the bearing 23. The flexibility of the annular portion 33 of the planet carrier 28 assists to substantially isolate those forces from the planet gears.

The present invention thus teaches, in its broadest aspect, that by providing pairs of single helical planet gears on a bogie plate use may be made of ring and sun gears which do not need to be of a split construction.

The present invention teaches in another of its aspects that the planet gears may be supported, via their bearings, on a shaft of the so-called flexpin type, such as described in GB 1,101,131 in the context of a simple type of epicyclic gear. The present invention, in this one of its aspects, perceives that special benefit may be achieved by utilising a shaft of the flexpin type in the context of an epicyclic gear unit having a planet bogie.

Figure 4:
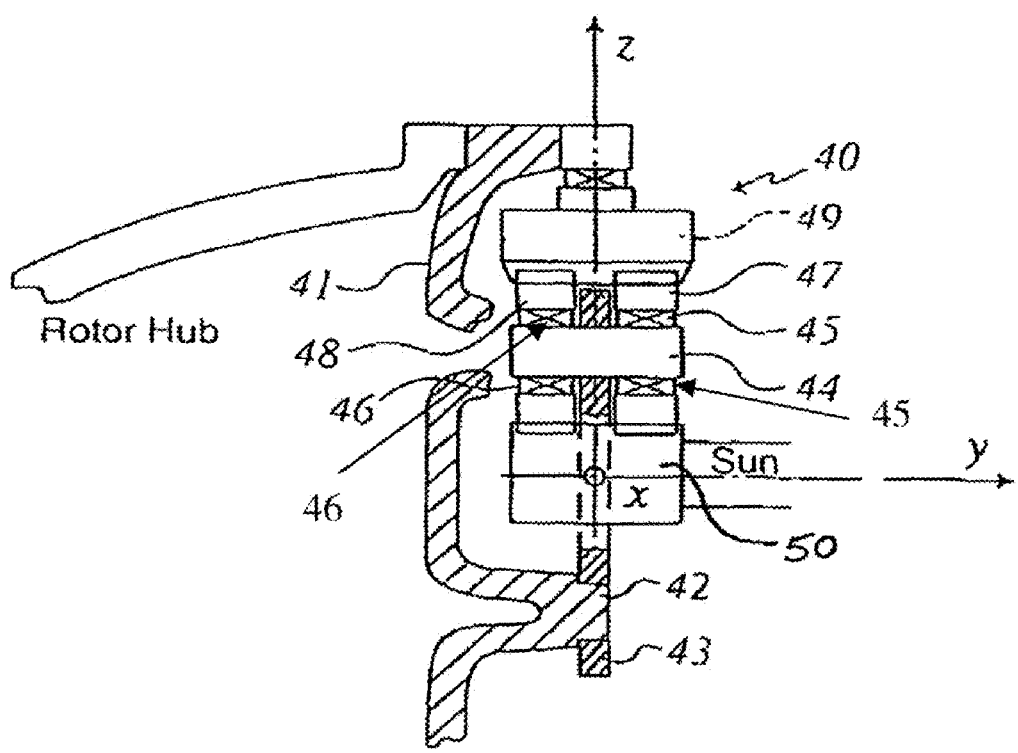
FIG. 4 shows a particular feature of the present invention.

A variation of the FIG. 4 construction to utilise a flexpin as the shaft 44 thereof is now discussed in more detail.

Figure 5:
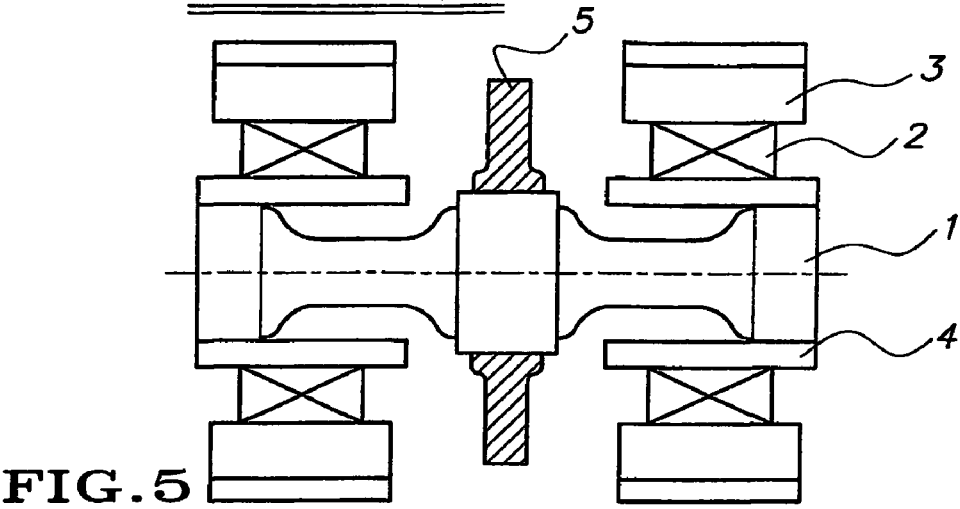
FIG. 5 is a sectional view of a pair of planet gears supported rotatably on planet shafts of the flexpin type at opposite sides of a bogie plate.
Figure 6:
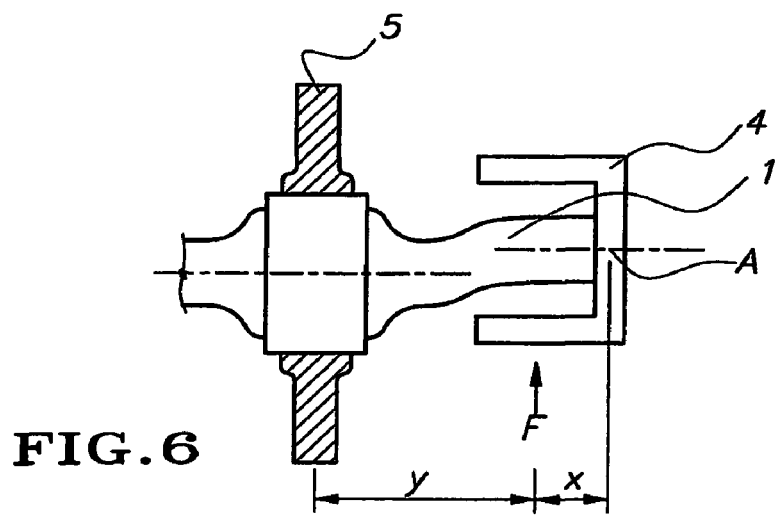
FIG. 6 is illustrating the working principle behind one such planet shaft of the flexpin type.

FIG. 5 shows the basic layout. The back-plate 5, i.e. bogie plate, drives the inner part of the planet shaft 1 which in turn carries the outer part or sleeve (4), the planet bearing 2 and the planet 3. The function of the flexpin in the context of application to a bogie is now described briefly with reference to FIG. 6. An external force (for instance the tangential planet forces) will cause the inner shaft 1 to bend as a result of the bending moment F*y. Point "A" is offset by a distance "x" from the application point of the force causing a moment F*x. This bending moment at "A" works in the opposite direction to the first one and thus causes the outer sleeve to counter rotate in the direction of the second moment.

The amount of compensation will depend upon the distances x and y as well as the designs of the inner shaft and sleeve. The use of the flexpin is advantageous for load distribution over the tooth flanks (KHβ) as well as load sharing between the planets in the planetary cell (K_gamma). The equality of loads between the planets (K_gamma) will be inversely proportional to the stiffness of the planet shafts and it is thus preferred to make the planet shafts as flexible as possible.

The amount of compensation could be equal at both sides of the central bogie plate but does not have to be. Particularly if the gear unit comprises a helical sun gear it may be advantageous to choose different amounts of compensation in order for the left and right planets to better follow the helical deformation of the sun shaft under load. (Due to torsion). This would not be possible in the classical flexpin designs as there is only one row of planets, but is possible in the application to a planet bogie.

Figure 7:
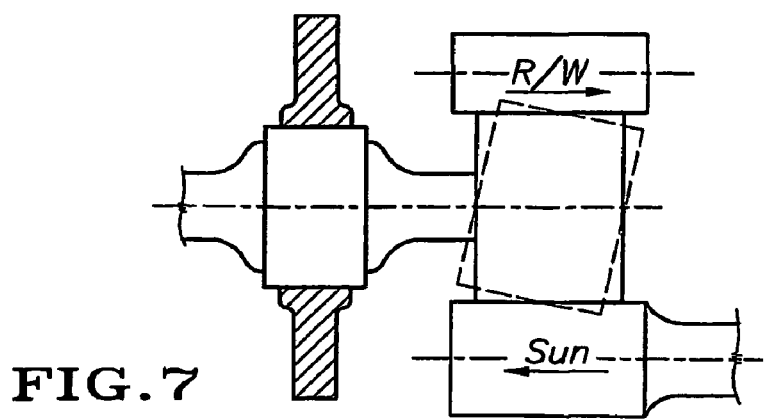
FIG. 7 represents a planet shaft which is connected at one end to a bogie plate and which is supporting a planet gear for interaction with a ring wheel and a sun wheel, the skewing effect that exists on the planet gear when helical teeth is used being indicated by dashed lines.
Figure 8:
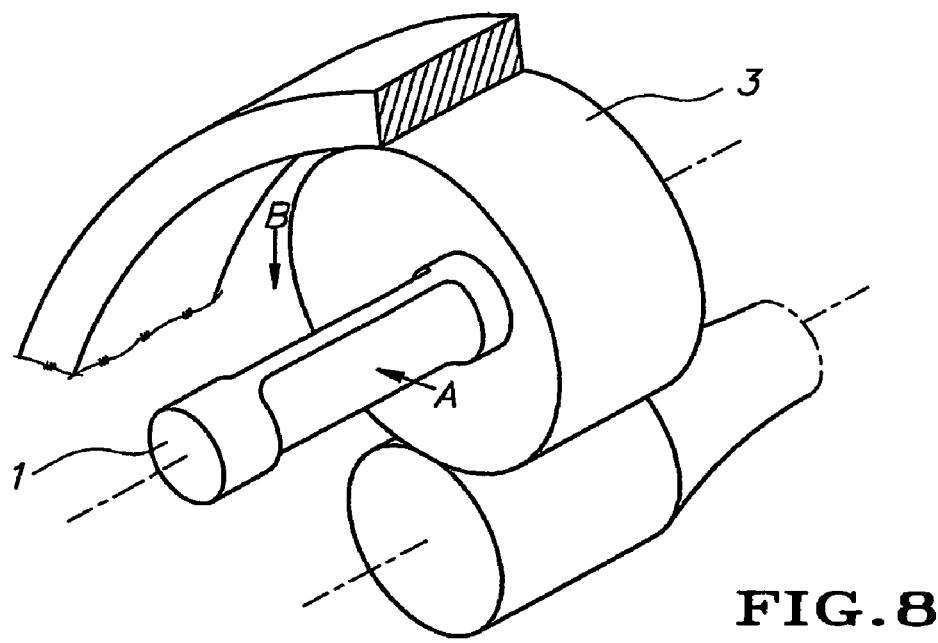
FIG. 8 represents in perspective view a planet shaft of the flexpin type which has an anisotropic part for supporting a planet gear between a sun and a ring wheel.
Figure 9:
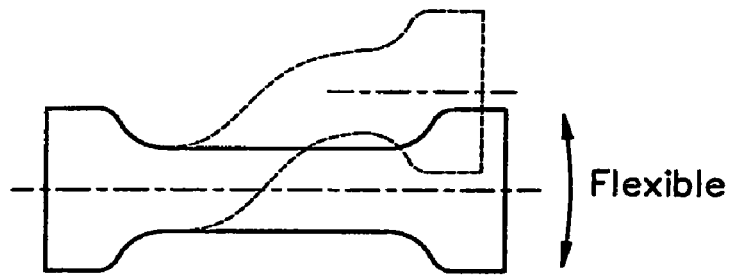
FIG. 9 represents a top view on the shaft represented in FIG. 8, the dashed lines demonstrating the planet shafts' flexibility in the tangential direction.
Figure 10:
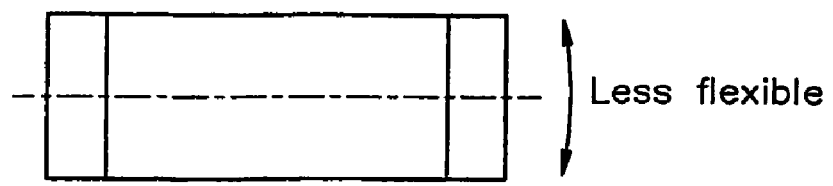
FIG. 10 is a side view on the planet shaft represented in FIG. 8, the dashed lines demonstrating the planet shafts' less flexible structure in a place normal to the tangential direction.

When using helical teeth in a planetary cell, a moment is created by the axial components of the normal tooth forces in the ring gear and sun meshes respectively (see FIG. 7). This unwanted effect causes the planets to skew and the amount of skewing is inversely proportional to the planet shaft stiffness. With a flexpin design, the planet shaft assembly (inner shaft and sleeve) is less stiff than in conventional designs and will thus cause more planet skewing. This is the reason that the flexpin is usually only used with spur gearing. A possible solution to this problem could come from making the planet shaft (inner or combination) an-isotropic as far as it's stiffness goes. FIGS. 8 to 10 show a planetary system employing such a design. The inner shaft is made in such a way as to still allow the needed flexibility in the tangential direction (see FIG. 9) but to be as stiff as possible in a plane normal to the tangential direction (FIG. 10). In this way it could become possible to use the flexpin in combination with helical teeth.

The invention claimed is:

1. A planetary gear transmission unit comprising:
   a sun, planet and ring gears; and
   a planet carrier, said planet carrier comprising:
   a planet bogie plate which supports and locates circumferentially spaced pairs of planet gears,
   wherein the two planet gears of each pair are positioned at opposite sides of the plate, each of said sun and ring gears being double helical and each of the planet gears of a given said pair being single helical and having a helix angle opposite to that of the other planet gear of the given said pair, each planet gear of said pair is mounted on a pair of tapered roller bearings.

2. The gear transmission unit according to claim 1, wherein the sun gear is a unitary sun gear.

3. The gear transmission unit according to claim 1, wherein the ring gear is a unitary ring gear.

4. The gear transmission unit according to claim 1 and comprising the pair of tapered roller bearings arranged in an O configuration.

5. The gear transmission unit according to claim 1, wherein the bearings for each circumferentially spaced planet gear position are supported on a shaft which, in use, self adjusts in an angular position relative to the bogie plate.

6. The gear transmission unit according to claim 1, wherein the bearings for at least some circumferentially spaced planet gear positions are supported on a shaft which is substantially, rigidly secured to the bogie plate.

7. The gear transmission unit according to claim 6, wherein each said shaft is substantially rigidly secured to the bogie plate.

8. The gear transmission unit according to claim 5, wherein the bogie plate is able to deform elastically to allow self adjustment of the angular position of each shaft relative to the axis of rotation of the ring gear.

9. The gear transmission unit according to claim 1, wherein a main bearing comprises an inner ring bearing surface of a diameter greater than that of the toothed surface of the ring gear.

10. The gear transmission unit according to claim 1, wherein the planet carrier provides a radially extending torque transmissions path which is torsionally stiff but relatively compliant in an axial direction parallel with the axis about which the rotational forces act.

11. The gear transmission unit according to claim 1, wherein the planet gears are supported relative to the bogie plate by a flexpin shaft.

12. The gear transmission unit according to claim 6, wherein the bogie plate is able to deform elastically to allow self adjustment of the angular position of each shaft relative to the axis of rotation of the ring gear.

13. The gear transmission unit according to claim 7, wherein the bogie plate is able to deform elastically to allow self adjustment of the angular position of each shaft relative to the axis of rotation of the ring gear.

* * * * *